US010655770B2

(12) United States Patent
Gennasio et al.

(10) Patent No.: US 10,655,770 B2
(45) Date of Patent: May 19, 2020

(54) FEMALE QUICK COUPLING ENGAGEABLE UNDER PRESSURE

(71) Applicant: ALFA GOMMA S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: ALFA GOMMA S.p.A., Vimercate (IT)

( * ) Notice: Subject to any disclaimer, the term of this patent is extended or adjusted under 35 U.S.C. 154(b) by 36 days.

(21) Appl. No.: 15/572,311

(22) PCT Filed: May 4, 2016

(86) PCT No.: PCT/EP2016/059976
§ 371 (c)(1),
(2) Date: Nov. 7, 2017

(87) PCT Pub. No.: WO2016/177769
PCT Pub. Date: Nov. 10, 2016

(65) Prior Publication Data
US 2018/0142824 A1 May 24, 2018

(30) Foreign Application Priority Data
May 7, 2015 (IT) .............................. MI2015A0642

(51) Int. Cl.
*F16L 37/32* (2006.01)
*F16L 37/36* (2006.01)
(Continued)

(52) U.S. Cl.
CPC ............... *F16L 37/36* (2013.01); *F16L 37/23* (2013.01); *F16L 37/32* (2013.01); *F16L 37/62* (2013.01)

(58) Field of Classification Search
CPC ......... F16L 29/04; F16L 37/08; F16L 37/084; F16L 37/22; F16L 37/23; F16L 37/28;
(Continued)

(56) References Cited

U.S. PATENT DOCUMENTS

| 4,394,874 A * | 7/1983 | Walter | F16L 37/23 137/614.02 |
| 4,683,905 A * | 8/1987 | Vigneau | F16L 29/02 137/329.1 |

(Continued)

FOREIGN PATENT DOCUMENTS

| DE | 19619839 C1 | 5/1997 | |
| DE | 10351997 A1 * | 6/2005 | ............. F16L 37/23 |

(Continued)

OTHER PUBLICATIONS

International Search Report dated Jul. 6, 2016 during the prosecution of International Application No. PCT/EP2016/059976.

*Primary Examiner* — Hailey K. Do
(74) *Attorney, Agent, or Firm* — Troutman Sanders LLP

(57) ABSTRACT

The female quick coupling engageable under pressure, comprises an outer tubular support body which extends along an axis of the coupling and has a front end and a rear end, a hollow valve body supported inside the support body and having an inlet path distal from the front end and an outlet path proximal to the front end of the support body, an obturator slidable in the valve body in the direction of the axis of the coupling so as to open and close the outlet path, the obturator comprising a mushroom-shaped head and a housing and support body for the guided sliding of the mushroom-shaped head, the housing body having an occlusion element engageable in a seat of the valve body so as to close the outlet path, a means being provided for deferring the movement of the housing body relative to said mushroom-shaped head.

8 Claims, 3 Drawing Sheets

(51) Int. Cl.
*F16L 37/23* (2006.01)
*F16L 37/62* (2006.01)

(58) Field of Classification Search
CPC ..... F16L 37/30; F16L 37/32–36; F16L 37/62;
F16L 29/02; F16L 29/007; F16L 37/40;
F16L 37/42; F16L 37/44; Y10T
137/87925; Y10T 137/87941; Y10T
137/87949; Y10T 137/87965; Y10T
137/87973; Y10T 137/87957
See application file for complete search history.

(56) References Cited

U.S. PATENT DOCUMENTS

| | | | | |
|---|---|---|---|---|
| 4,896,697 | A * | 1/1990 | Stromdahl | F16L 37/23 |
| | | | | 137/614 |
| 5,884,897 | A * | 3/1999 | Arosio | F16L 37/23 |
| | | | | 137/614.03 |
| 5,934,319 | A | 8/1999 | Schumacher | |
| 6,179,001 | B1 * | 1/2001 | Schutz | F16L 37/565 |
| | | | | 137/614.01 |
| 2004/0079423 | A1 * | 4/2004 | Mikiya | F16L 37/34 |
| | | | | 137/614.03 |
| 2005/0230651 | A1 * | 10/2005 | Magnus | F16L 37/34 |
| | | | | 251/149.6 |
| 2015/0000770 | A1 * | 1/2015 | Brand | F16K 15/025 |
| | | | | 137/515 |

FOREIGN PATENT DOCUMENTS

| | | | |
|---|---|---|---|
| EP | 1058043 | A1 | 12/2000 |
| EP | 2818781 | A1 | 12/2014 |

* cited by examiner

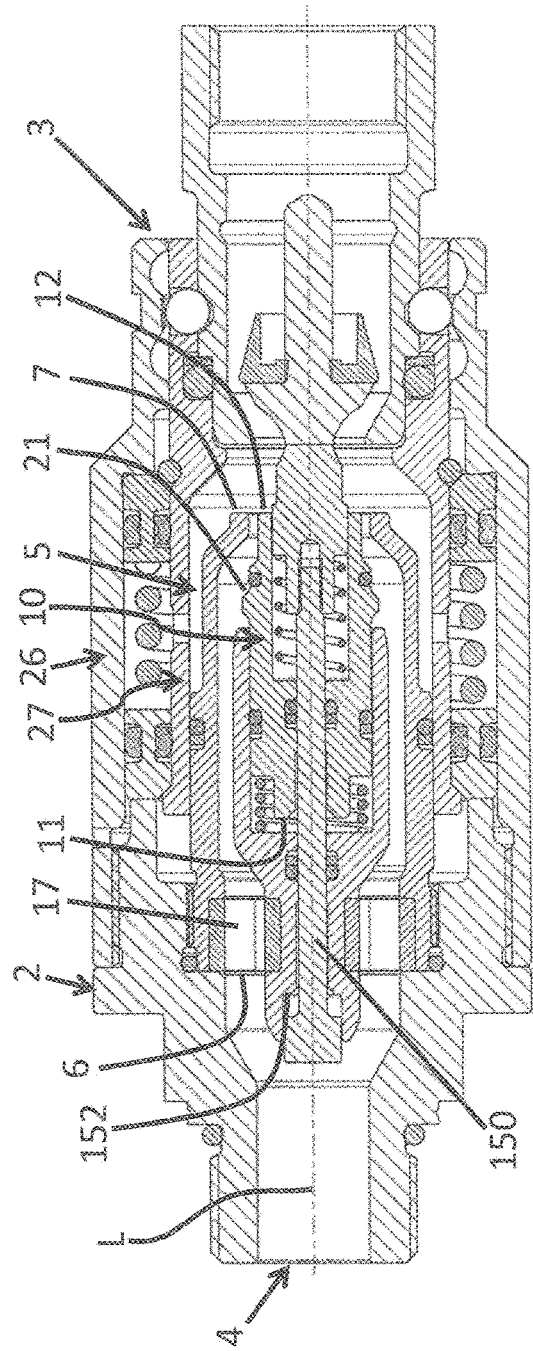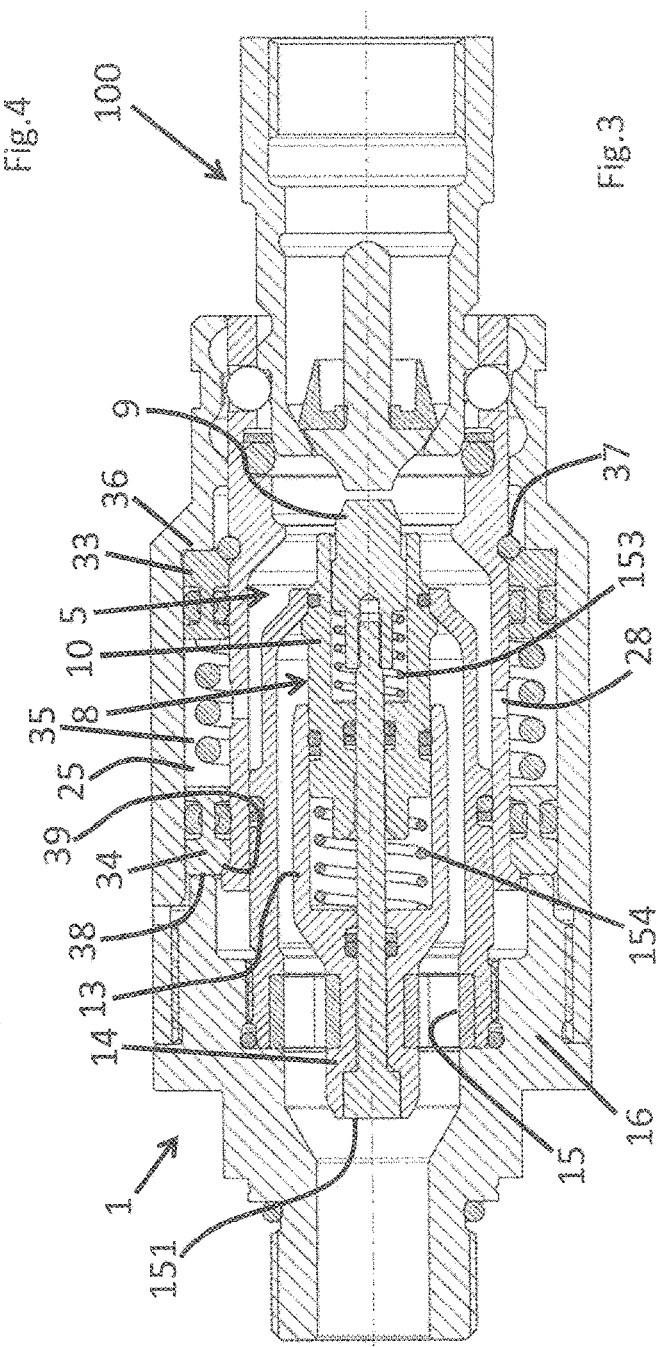

FEMALE QUICK COUPLING ENGAGEABLE UNDER PRESSURE

CROSS-REFERENCE TO RELATED APPLICATIONS

This is a U.S. national phase application under 35 U.S.C. § 371 of International Patent Application No. PCT/EP2016/059976, filed May 4, 2016, and claims benefit of priority to Italian Patent Application No. MI2015A 000642, filed May 7, 2015. The entire contents of these applications are hereby incorporated by.

FIELD OF TECHNOLOGY

The present invention relates to a female quick coupling engageable under pressure, particularly a hydraulic or oil-hydraulic quick coupling to be used in agricultural and industrial applications.

BACKGROUND

A female quick coupling engageable under pressure generally comprises an outer tubular support body, a hollow valve body supported inside the support body and an obturator slidable in the valve body in the direction of the axis of the coupling so as to open and close the outlet path.

In some types of female quick couplings the obturator has a mushroom head intended to interact with a corresponding head of an obturator of a male quick coupling.

One of the main drawbacks of a female quick coupling of the type with an obturator having a mushroom head consists of the risk of early opening of the obturator which could generate uncontrolled fluid leaks before the coupling has been fully engaged under pressure. Another drawback consists of the fact that the obturator may have a configuration such that the pressure of the fluid present in the valve body may hinder the completion of the coupling engagement under pressure.

SUMMARY

The technical task set by the present invention is to provide a female quick coupling engageable under pressure which overcomes the described drawbacks of the prior art. Within the context of this technical task, an object of the invention is to provide a female quick coupling engageable under pressure without fluid leaks.

Another object of the invention is to provide a female quick coupling engageable under pressure with the minimum effort possible for the operator.

The technical task, as well as these and other objects, according to the present invention, are reached by providing a female quick coupling engageable under pressure, comprising an outer tubular support body which extends along an axis of the coupling and has a front end and a rear end, a hollow valve body supported inside the support body and having an inlet path distal from the front end and an outlet path proximal to the front end of the tubular support body and an obturator slidable in the valve body in the direction of the axis of the coupling so as to open and close the outlet path, characterized in that said obturator comprises a mushroom-shaped head and a housing and support body for the guided sliding of said mushroom-shaped head, said housing body having an occlusion element engageable in a seat of the valve body so as to close said outlet path, and in that there is provided a means for deferring the movement of said housing body relative to said mushroom-shaped head.

The housing body has a rear end distal from said front end of said tubular support body and an open front end proximal to said front end of said tubular support body from which said mushroom head sticks out.

The deferring means preferably comprise a first elastically yieldable element interposed between said housing body and a fixed guide element for said housing body, and a second elastically yieldable element interposed between said mushroom head and said housing body or between said mushroom head and said fixed guide element for said housing body.

The first and second elastically yieldable elements comprise preferably a first and a second helical spring arranged coaxially along the direction of the axis of the coupling. Preferably said housing body has a cylindrical outer surface coaxial with the axis of the coupling.

Preferably the occlusion element is in the form of an external flange of said housing body.

Preferably the support body delimits a variable-volume chamber in fluid communication with said valve body when said obturator is in the open position. Preferably said variable-volume chamber is delimited between an outer fixed cylindrical wall of the support body and an inner cylindrical wall of the support body which is slidable along the axis of the coupling.

Preferably said slidable cylindrical wall has at least one calibrated through opening whereby it is in fluid communication with the valve body.

In a preferred embodiment of the invention the mushroom head extends rearwards with a pin having a rear end exposed to the pressure of the fluid present in the closed valve body of the female coupling under pressure.

The present invention also reveals a connection method of a female quick coupling engageable under pressure with a male quick coupling, wherein each coupling comprises a valve body equipped with a mobile obturator in contrast and by the action of elastic means, characterized in that it delays the opening of the obturator of the female coupling due to its head engagement with the obturator of the male coupling through the breakdown of the obturator of the female coupling in a mushroom head moveable first and a slidable housing and support body guided by said mushroom head movable later than said mushroom head.

BRIEF DESCRIPTION OF THE DRAWINGS

Further characteristics and advantages of the invention will more fully emerge from the description of a preferred but not exclusive embodiment of the female quick coupling engageable under pressure according to the invention, illustrated by way of indicative and non-limiting example in the accompanying drawings, in which:

FIG. 3 illustrates another female quick coupling in the disengaged position in a male quick coupling of the congruent type, wherein the couplings are shown in the axial section; and FIG. 4 illustrates a female quick coupling of FIG. 3 in the engaged position in a male quick coupling of the congruent type, wherein the couplings are shown in the axial section.

Equivalent parts are indicated in the preferred embodiments of the invention using the same reference number.

DETAILED DESCRIPTION

Figure 1:
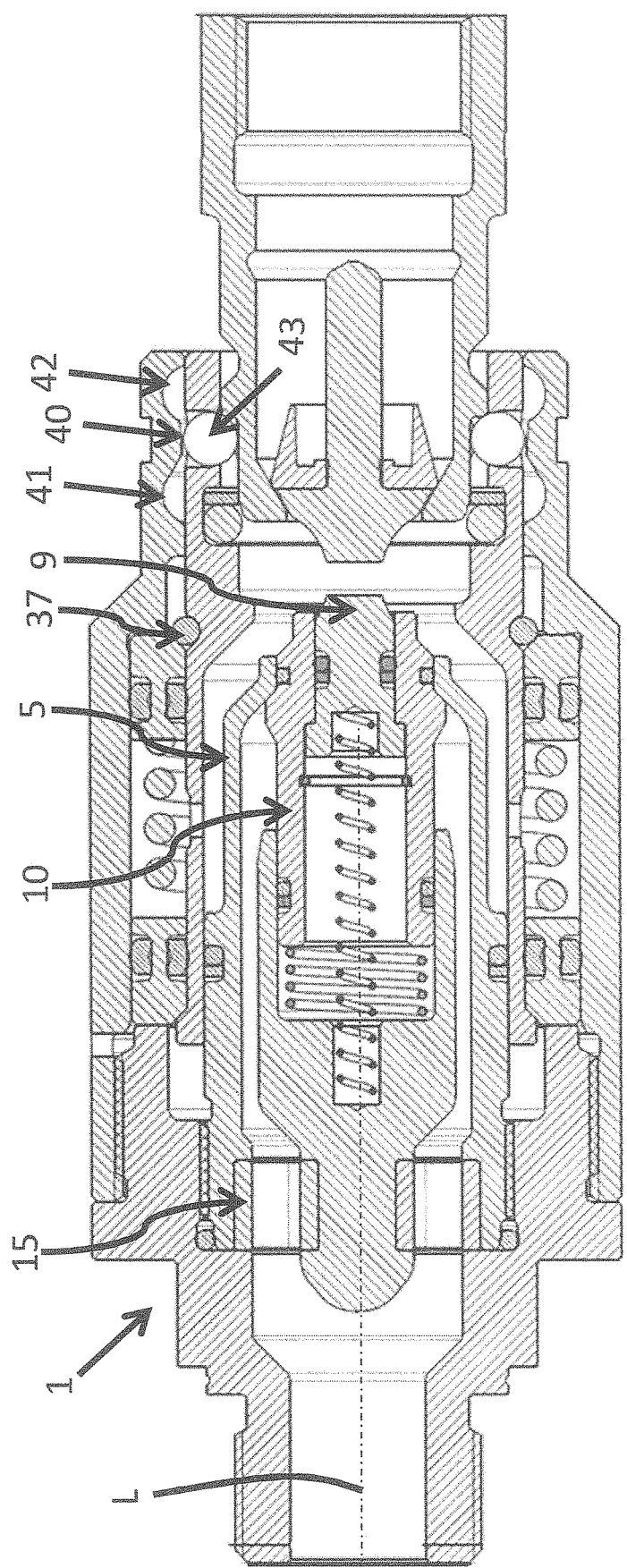
FIG. 1 illustrates a female quick coupling in the disengaged in a male quick coupling of the congruent type, wherein the couplings are shown in the axial section.

With reference to the mentioned figures, a special female quick hydraulic coupling 1 is shown, engageable under pressure in a male coupling 100 of the congruent type, commonly found on the market.

The female quick coupling 1 comprises an outer tubular support body 2 which extends along an axis L of the coupling 1 and has a front end 3 and a rear end 4. The support body 2 supports a hollow valve body 5 inside having an inlet path 6 distal from the front end 3 of the tubular body 2 and an outlet path 7 proximal to the front end 3 of the support body 2. In the valve body 5 there is an obturator 8 slidable in the direction of the axis L of the coupling 1 so as to open and close the outlet path 7.

The obturator 8 comprises a mushroom head 9 and a housing and support body 10 for the guided sliding of the mushroom head 9.

The housing body 10 has a rear end 11 distal from the front end 3 of the support body 2 and an open front end 12 proximal to the front end 3 of the support body 2. In particular, a fixed guide element supports the housing body 10 slidably in the direction of the axis L of the coupling 1.

The fixed guide element for the housing body 10 is formed by a bushing 13 positioned within the valve body 5 and having an open front end for the introduction of the housing body 10 and a rear base from which a stem 14 extends externally rigidly supported by a perforated plate 15 fixed to the valve body 5 in turn fixed to a wall 16 of the support body 2.

The through holes 17 in the plate 15 place in fluid communication the inlet path 6 of the valve body 5 at the rear end 4 of the support body 2 from which the fluid enters the coupling 1.

The mushroom head 9 sticks out from the front end 12 of the housing body 10 and is slidable in the direction of the axis L of the coupling 1.

The housing body 10 has a cylindrical outer surface coaxial with the axis L of the coupling 1.

The housing body 10 is externally equipped with an occlusion element 21 engageable in a seat 20 of the valve body 5 so as to close the outlet path 7.

The occlusion element 21 is in the form of a perimetral flange which extends on the cylindrical outer surface of the housing body 10.

Figure 2:
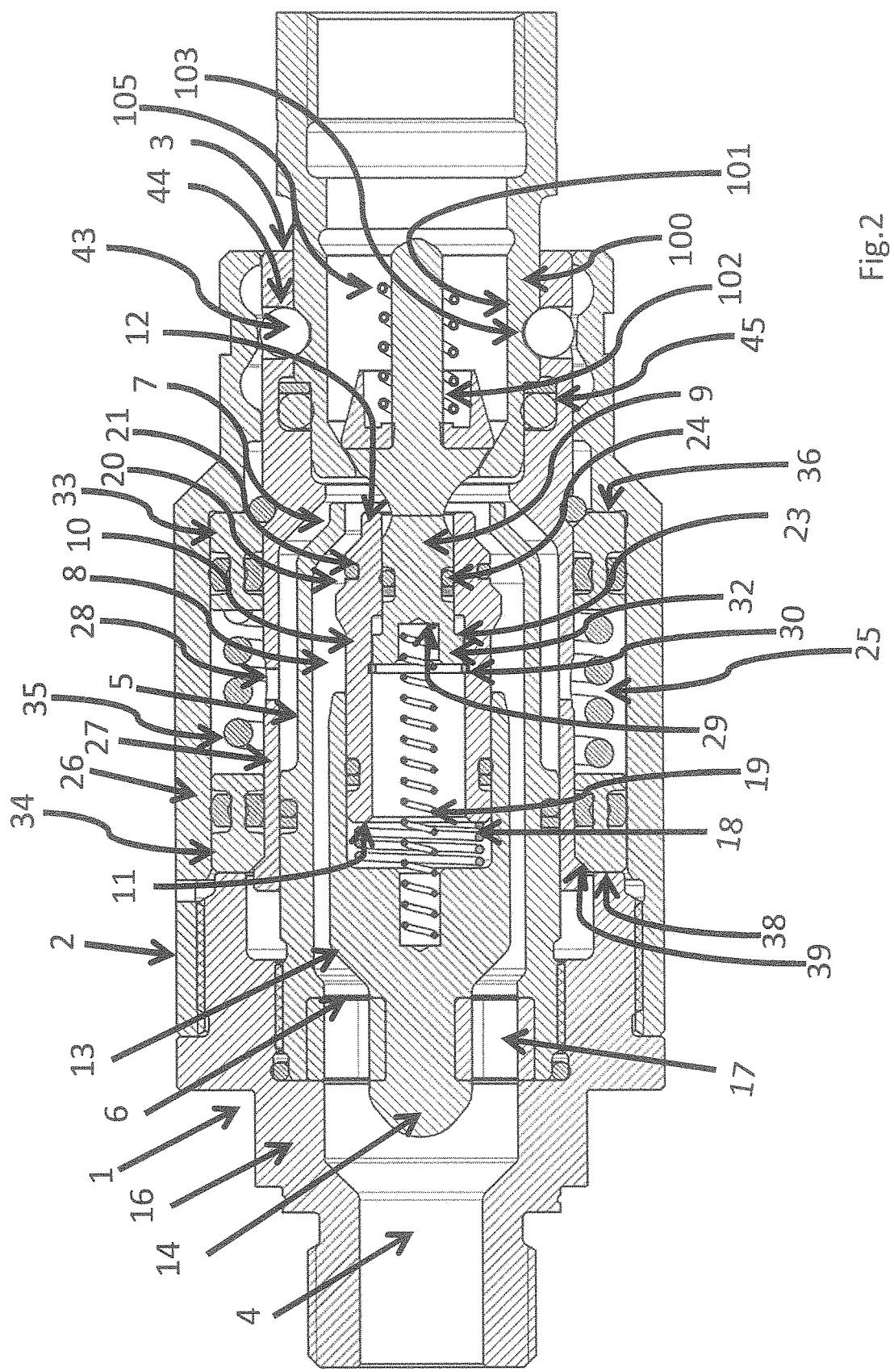
FIG. 2 illustrates a female quick coupling of FIG. 1 in the engaged position in a male quick coupling of the congruent type, wherein the couplings are shown in the axial section.

Advantageously, for the reasons that will become clearer below, deferring means are provided for deferring the movement of the housing body 10 relative to the mushroom head Reference is now made to FIGS. 1 and 2.

The deferring means comprise a first elastically yieldable element interposed between the housing body 10 and the fixed guide element for the housing body 10, and a second elastically yieldable element interposed between the housing body 10 and the mushroom head 9.

The second elastically yieldable element is less rigid than the first elastically yieldable element.

The first elastically yieldable element and respectively the second elastically yieldable element comprise a first helical spring 18 and respectively a second helical spring 19 arranged coaxially along the direction of the axis L of the coupling 1.

The housing body 10 has a stroke end stop 23 for the mushroom head 9. Between the mushroom head 9 and the housing body 10 relevant fluid sealing means are interposed, for example a gasket 24.

The first helical spring 18, which works in compression, has its rear end engaged in a recess of the rear base of the bushing 13 and its front end engaged with a terminal 29 resting against the rear side of a ring 30 fixed into an intermediate inner section of the housing body 10.

The second helical spring 10, which works in compression, has its rear end engaged against a washer 32 resting on the front side of the ring 30 and its front end engaged in a recess of the rear base of the mushroom head 9.

Reference is now made to FIGS. 3 and 4.

In this case the mushroom head 9 extends rearwards with a pin 150 oriented coaxially to the axis L and arranged passing through sliding channels especially afforded in the housing body 10 and in the fixed guide element for the housing body 10.

The pin 150 has an enlarged rear end 151 on which the pressure of the fluid, if any, in the female coupling 1 acts directly even when the valve body 5 is closed.

The enlarged rear end 151 of the pin 150 is adapted to interfere with a shoulder 152 of the stem 14 to prevent the complete extraction of the mushroom head 9 from the housing body 10.

The deferring means comprise in this case a first elastically yieldable element interposed between the mushroom head 9 and the housing body 10 and a second elastically yieldable element interposed between the housing body 10 and the fixed guide element for the housing body 10.

The first elastically yieldable element and respectively the second elastically yieldable element comprise a first helical spring 153 which works in compression and respectively a second helical spring 154 which works in compression, arranged coaxially along the direction of the axis L of the coupling 1.

Reference is now made again to all the figures.

The support body 2 delimits at least one variable-volume chamber 25 in fluid communication with the hollow valve body 5 when the obturator 8 is in the open position.

The variable-volume chamber 25 is delimited between an outer fixed cylindrical wall 26 of the support body 2 and an inner cylindrical wall 27 of the support body 2 which is slidable in the direction of the axis L of the coupling 1.

The chamber 25 has inside a front gasket 33 placed straddling relevant front stops 36 and respectively 37 on the fixed cylindrical wall 26 and respectively on the slidable cylindrical wall 27, a rear gasket 34 placed straddling relevant rear stops 38 and respectively 39 present on the fixed cylindrical wall 26 and respectively on the slidable cylindrical wall 27, and an elastic element 35 interposed between the front gasket 33 and the rear gasket 34.

The elastic element 35, which works in compression, is formed by a helical spring coaxial with the axis L of the coupling 1.

The slidable cylindrical wall 27 of the support body 2 has one or more calibrated through openings 28 whereby it is in fluid communication with the valve body 5 when this is open.

The female quick coupling 1 is equipped at the front with locking means for locking the male quick coupling 100 in the engaged position.

The locking means comprise on the fixed wall 26 of the support body 2 an inner perimetral projection 40 comprised between two inner perimetral grooves 41 and 42, and on the slidable wall 27 of the support body 2 a crown of balls 43 positioned in truncated conical seats 44 and adapted to cooperate, as will be seen, with the perimetral projection 40.

The male quick coupling 100 comprises a valve body 101 in which an obturator 102 is slidable.

The valve body 101 of the male quick coupling 100 has at the front an outer perimetral groove 103 adapted to cooperate with the balls 43 for performing the lock. The obturator 102 of the male coupling 100 is mobile in contrast and by the action of an elastic element 105 (only shown in FIG. 1).

The slidable wall 27 of the valve body 2 of the female quick coupling 1 has to the front of the valve body 5 but to the rear of the crown of balls 43 an inner sealing gasket 45 engageable with the valve body 101 of the male quick coupling 100. With reference to the solution shown in FIGS. 1 and 2, the quick connection of the female coupling under pressure 1 with the coupling 100, for example but not necessarily also under pressure, takes place as follows.

The couplings 1, 100 initially have respective obturators 8, 102, in the closed position. When the operator introduces the male coupling under pressure 100 into the female coupling under pressure 1, the valve body 101 of the male coupling 100 due to interference with the balls 43 pushes the mobile wall 27 moving it towards the rear end of the valve body 2.

Due to the effect of retracting the mobile wall 27 the seats 44 become aligned with the most internal groove 41 and the balls 43 move into the seats 44 hence releasing the valve body 101 of the male coupling 100 which, continuing to penetrate, brings the head of its obturator 102 to rest against the head 9 of the obturator 8 of the female coupling 1.

The retraction of the mobile wall 27 causes the front gasket 33 to be brought closer, dragged by the stop 36, to the rear gasket 34 and the spring 35 to be loaded, determining the compression of the spring.

Due to the effect of a further penetration of the male coupling 100, the thrust of the head of the obturator 102 of the male coupling 100, initially only causes the head 9 of the obturator 8 of the female coupling 1 to be withdrawn, while the housing body 10 of the obturator 8 of the female housing 1 initially remains stationary as the spring 18 that supports it is more rigid than the spring 19 that supports the head 9. Therefore, thanks to the deferring means, due to the effect of interference with the obturator of the male coupling 100, the mushroom head 9 is retracted towards the inside of the housing body 10 before the start of the retraction of the housing body towards the rear end 4 of the support body 2.

Only after the valve body 101 of the male coupling 100 is engaged with the sealing gasket 45, the rear base of the head 9 of the obturator 8 of the female coupling 1 engages the washer 32. In this configuration, no further contraction of the spring 19 is possible therefore the thrust force of the obturator 102 of the male coupling 100 is absorbed by the spring 18 which contracts causing the integral retraction of the head 9 and the housing body 10 of the obturator 8 of the female coupling 1 and the consequent opening of the outlet path 7.

For the whole retraction stroke of the head 9 of the housing body 10 the gasket 24 guarantees the fluid seal between the two parts so that the fluid under pressure cannot enter the free volume comprising the head 9, the housing body 10 and the terminal 29 and therefore not even the free volume comprised between the housing body 10, the bushing 13 and the terminal 29.

Given that the obturator 102 of the male coupling 100 is mobile in contrast and by the action of an elastic element 105 having higher rigidity than the rigidity of the spring 18, the opening of the obturator 102 of the male coupling 100 is delayed with respect to the opening of the obturator 8 of the female coupling 1.

Therefore, when the outlet path 7 opens, the fluid under pressure exiting the valve body 5 of the female coupling 1 invades the chamber 25 and exerts a thrust on the mobile wall 27 which assists the spring 35 in moving the mobile wall 27 towards the position in which the projection 40 interferes with the balls 43 and moves them into an engagement position of the groove 103 in which the male coupling 100 is locked into the female coupling 1 in the engaged position.

The fluid under pressure exiting the valve body 5 of the female coupling 1 also exerts a thrust on the obturator 102 which, prevailing over the counter-thrust exerted by the spring 105, makes it retract in opening.

The locking of the male coupling 100 into the female coupling 1 in the engaged position can be removed by the operator by exerting traction on the male coupling 100 in contrast to the action of the spring 35 which is loaded due to the effect of the interference of the stop 39 with the rear gasket 34.

Due to this traction the mobile wall 27 moves towards the extraction direction from the front end of the support body 2 until the balls 43 are aligned with the perimetral groove 42. The balls 43 are now released into the perimetral groove 42 into which they are introduced to free the male coupling 100.

When the male coupling 100 is removed, the spring 35 brings the mobile wall 27 back to the initial position.

One of the main advantages of this specific construction for the female quick coupling 1 engageable under pressure consists of the ability to engage guaranteeing the complete absence of fluid leaks since, due to the breakdown of the obturator 8 into two parts 9, 10, which can translate in a deferred way, when the obturator 102 of the male coupling 100 engages and moves the obturator 8 of the female coupling 1, the opening of the valve body 5 of the female coupling 1 can be delayed until the complete fluid tight engagement of the valve body 101 of the male coupling 100 with the gasket 45 especially provided in the mobile wall 27 of the support body 2 of the female coupling 1.

Furthermore, since the inner surfaces are wet by the female quick coupling 1 under pressure configured and arranged to balance the thrust forces in the axial direction generated on the mobile wall 27 by the fluid under pressure, the locking operation can be performed by hand without any particular problems.

Now, with reference to FIGS. 3 and 4, this construction is suitable for assisting in the opening of the male coupling 100 when the latter is under pressure.

As a matter of fact, the fluid under pressure acting on the enlarged head 151 of the pin 150 generates a thrust force in opening on the head of the obturator 102 of the male coupling 100 by the mushroom head 9 of the obturator 8 of the female coupling 1. Naturally, for the same hydraulic thrust, the opening and balancing between the heads of the two obturators are guaranteed by appropriately choosing the elastic properties of the springs.

The female quick coupling engageable under pressure as conceived herein is susceptible of numerous modifications and variants, all falling within the scope of the inventive concept; furthermore, all the details are replaceable by technically equivalent elements.

The materials used, as well as the dimensions, may in practice be of any type according to requirements and the state of the art.

The invention claimed is:

1. A female quick coupling engageable under pressure, comprising:
    an outer tubular support body, which extends along an axis of the female quick coupling and has a front end and a rear end,
    a fixed hollow valve body immovably supported inside the outer tubular support body and comprising an inlet path distal from the front end and an outlet path proximal to the front end of the outer tubular support body, and
    an obturator slidable in the fixed hollow valve body in a direction along the axis of the female quick coupling so as to open and close the outlet path, wherein said obturator comprises:
    a mushroom head, and
    a housing and support body slidably guiding said mushroom head,
    wherein said housing and support body comprises an occlusion element engageable in a seat of the fixed hollow valve body so as to close said outlet path,
    wherein said outer tubular support body delimits a variable-volume chamber in fluid communication with said fixed hollow valve body when said obturator is in the open position,
    wherein said variable-volume chamber is delimited between an outer fixed cylindrical wall of the outer tubular support body and an inner cylindrical wall of the support body, said inner cylindrical wall being slidable along the axis of the female quick coupling,
    wherein opening said fixed hollow valve body can be delayed until complete fluid tight engagement of a second valve body of a male quick coupling with a gasket provided in said inner cylindrical wall of said outer tubular support body, said inner cylindrical wall positioned between said outer fixed cylindrical wall and said fixed hollow valve body,
    wherein a fixed guide element supports said obturator, and
    a deferring element deferring a movement of said housing and support body relative to said mushroom head.

2. The female quick coupling engageable under pressure according to claim 1, wherein said housing and support body has a rear end distal from said front end of said outer tubular support body and an open front end proximal to said front end of said outer tubular support body from which said mushroom head comes out.

3. The female quick coupling engageable under pressure according to claim 1, wherein said deferring element comprises:
    a first elastically yieldable element interposed between said housing and support body,
    said fixed guide element for said housing and support body, and
    a second elastically yieldable element interposed between one of said mushroom head and said housing and support body or between said mushroom head and said fixed guide element for said housing and support body.

4. The female quick coupling engageable under pressure according to claim 1 wherein said first and second elastically yieldable elements comprise a first and a second helical spring, respectively, arranged coaxially along the direction of the axis of the female quick coupling.

5. The female quick coupling engageable under pressure according to claim 1, wherein said housing and support body has a cylindrical outer surface coaxial with the axis of the female quick coupling.

6. The female quick coupling engageable under pressure according to claim 1, wherein said occlusion element is in the form of an external flange of said housing and support body.

7. The female quick coupling engageable under pressure according to claim 1, wherein said slidable inner cylindrical wall has at least one calibrated through opening in fluid communication with the fixed hollow valve body.

8. The female quick coupling engageable under pressure according to claim 1, wherein said mushroom head extends rearwards with a pin having a rear end exposed to a pressure of a fluid present in the closed fixed hollow valve body.

* * * * *